United States Patent [19]
Marshall

[11] Patent Number: 5,129,677
[45] Date of Patent: Jul. 14, 1992

[54] PROTECTION SYSTEM FOR A VEHICLE

[76] Inventor: Donald J. Marshall, 1420 Alta Vista #316, Hollywood, Calif. 90046

[21] Appl. No.: 540,882

[22] Filed: Jun. 15, 1990

Related U.S. Application Data

[63] Continuation of Ser. No. 244,814, Sep. 14, 1988, abandoned.

[51] Int. Cl.⁵ .............................................. B60R 19/42
[52] U.S. Cl. .................................. 280/770; 150/166; 293/21; 293/118; 293/126; 296/136; 296/207
[58] Field of Search .............. 280/770; 296/207, 219, 296/117, 136; 293/118, 21, 119, 123, 126, 128; 150/167, 168, 166

[56] References Cited

U.S. PATENT DOCUMENTS

| | | | |
|---|---|---|---|
| 2,754,149 | 7/1956 | McGrath et al. | 296/117 |
| 3,718,357 | 2/1973 | Hertzell | 293/21 |
| 4,217,715 | 8/1980 | Bryan, Jr. | 293/128 |
| 4,221,410 | 9/1980 | Dawson | 293/21 |
| 4,437,697 | 3/1984 | Hinojos | 293/118 |
| 4,530,519 | 7/1985 | Marshall | 280/770 |
| 4,648,644 | 3/1987 | Swanson et al. | 293/118 |
| 4,693,508 | 9/1987 | Pettit | 296/100 |

FOREIGN PATENT DOCUMENTS

| | | | |
|---|---|---|---|
| 762339 | 7/1967 | Canada | 296/117 |
| 0204044A1 | 12/1986 | European Pat. Off. | |
| 2177362 | 11/1973 | France | |
| 2194764A | 3/1988 | United Kingdom | |

Primary Examiner—Andres Kashnikow
Assistant Examiner—Eric Culbreth
Attorney, Agent, or Firm—Lyon & Lyon

[57] ABSTRACT

A cover which covers the top and glassed area of a vehicle and includes hard, impact resistant panels to cover windows of the vehicle against breakage. The cover may be associated with bars which are stowed beneath the doors of the vehicle and which are movable upwardly to a position outwardly of the sides of the vehicle. When in the upper position, the bars protect the sides of the vehicle and prevent the doors from being opened. Controlling the bars are cables which are motor driven. Brackets extend outwardly from the cables to mount the bars. A locking latch may also ride within slits in the door and door jam to prevent the door of the vehicle from being opened when the system is in the operative position. With the protection bars in the up position, the cover may be attached thereto.

10 Claims, 7 Drawing Sheets

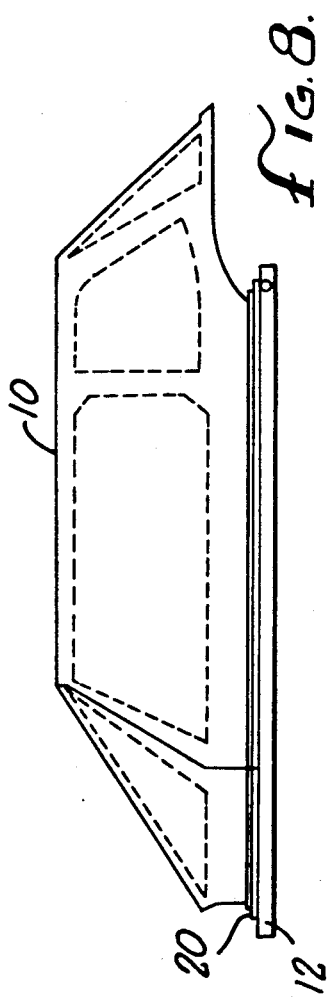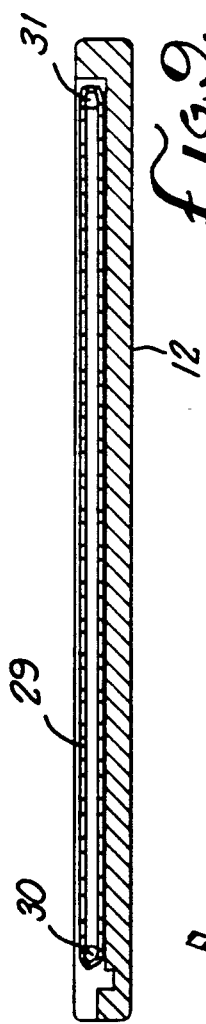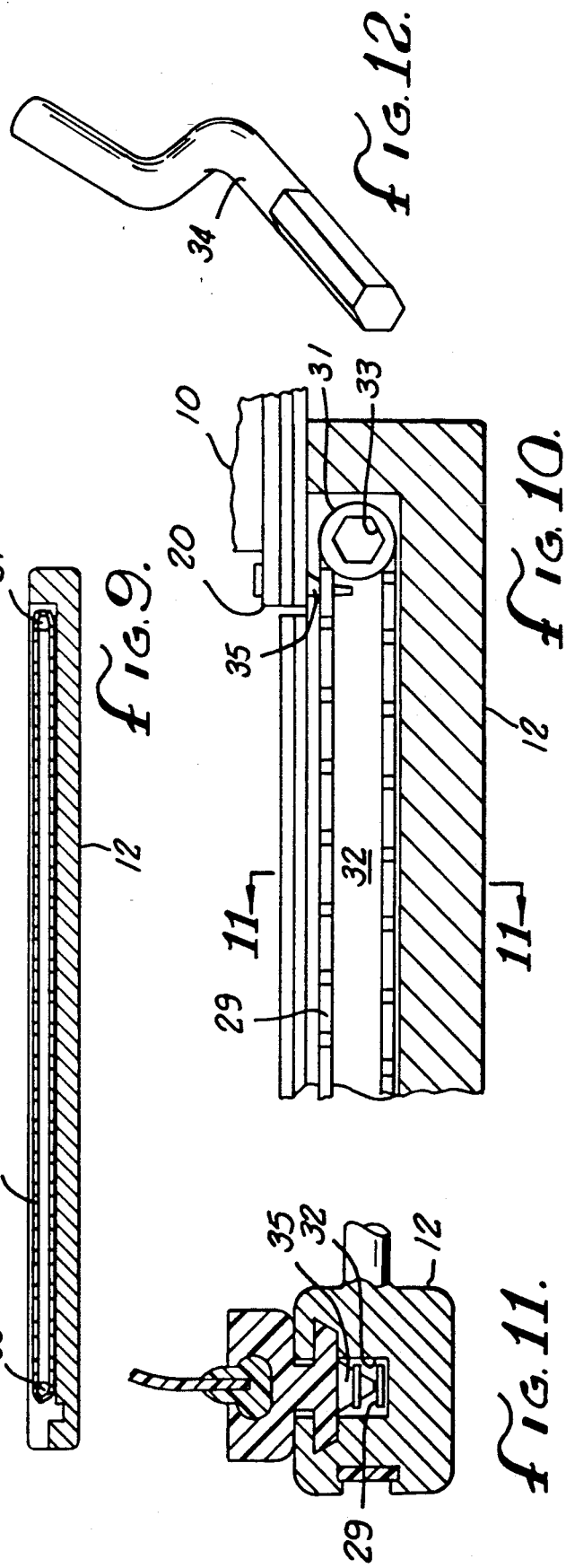

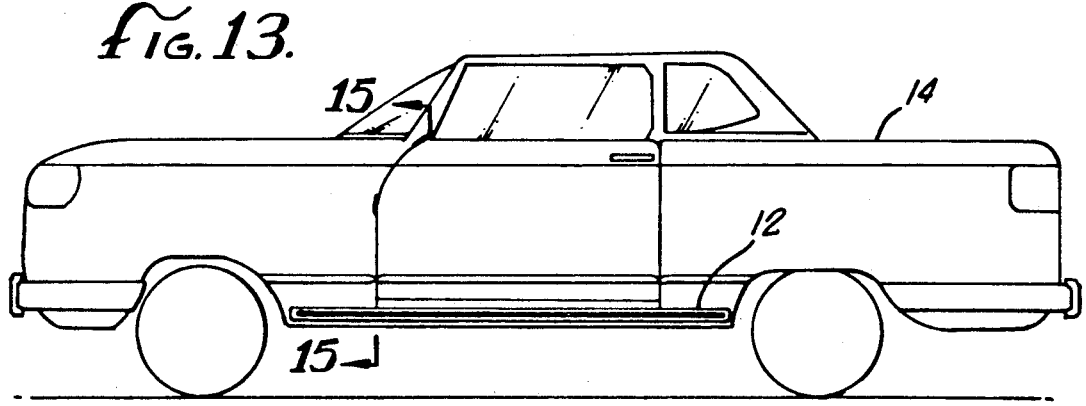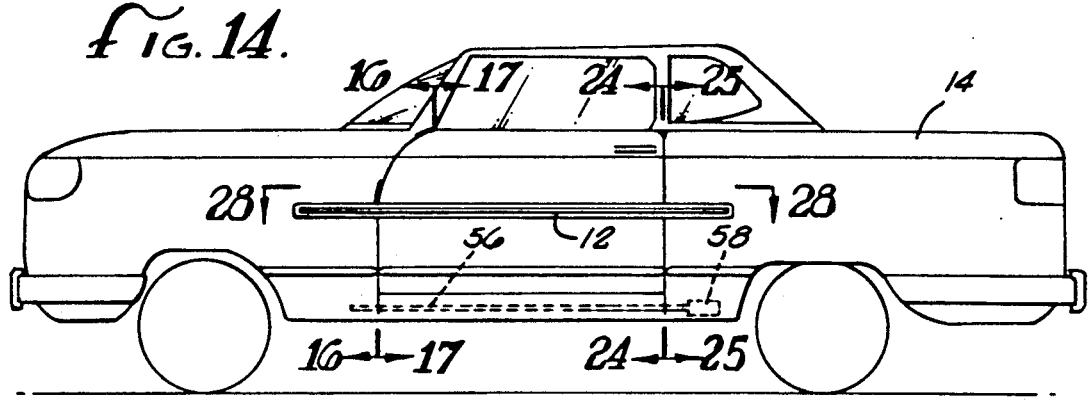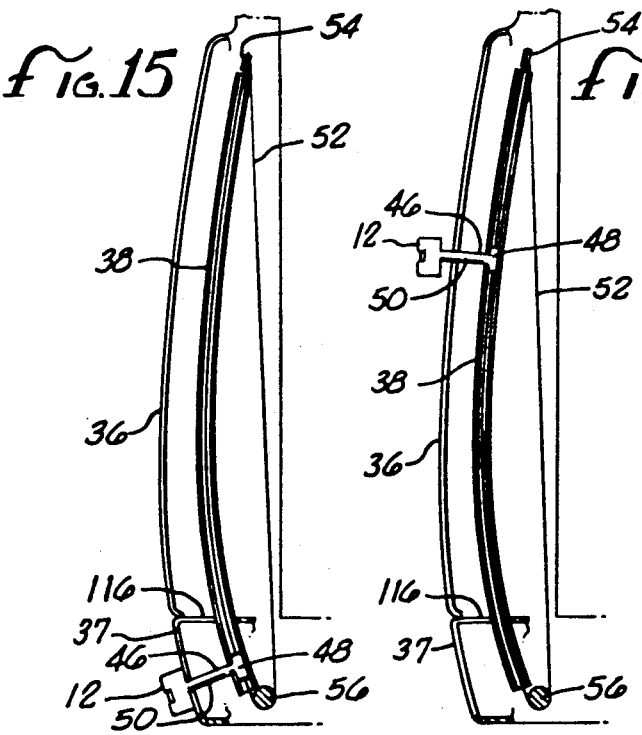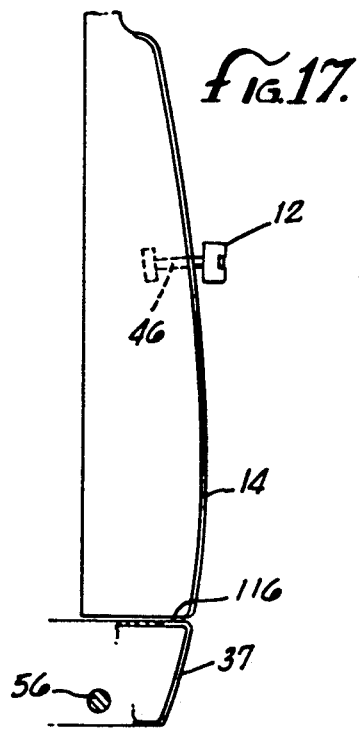

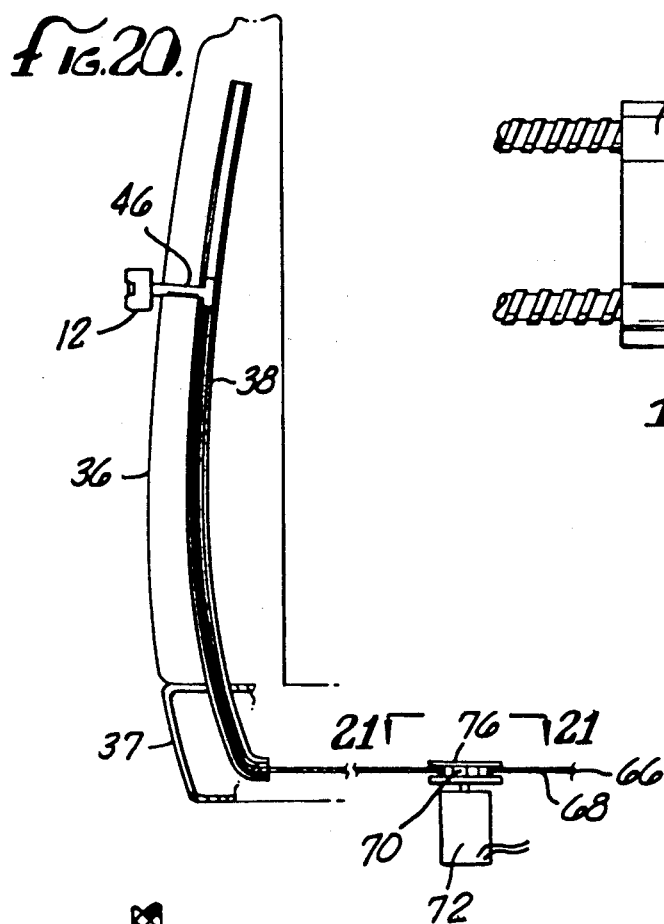
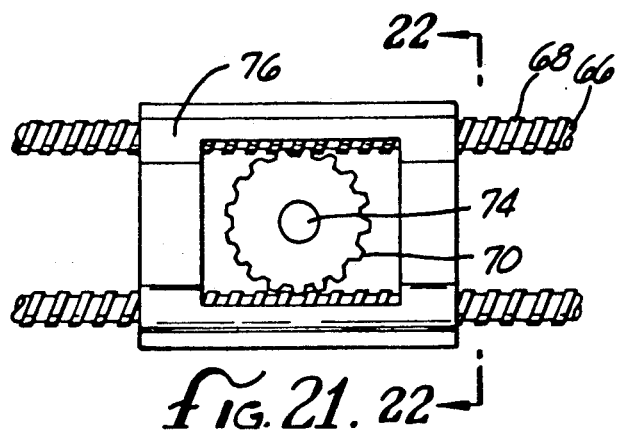
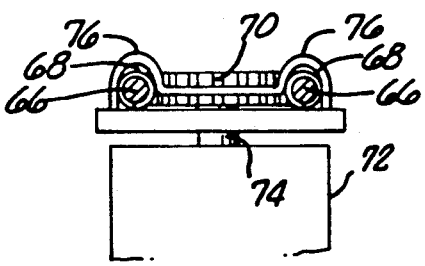
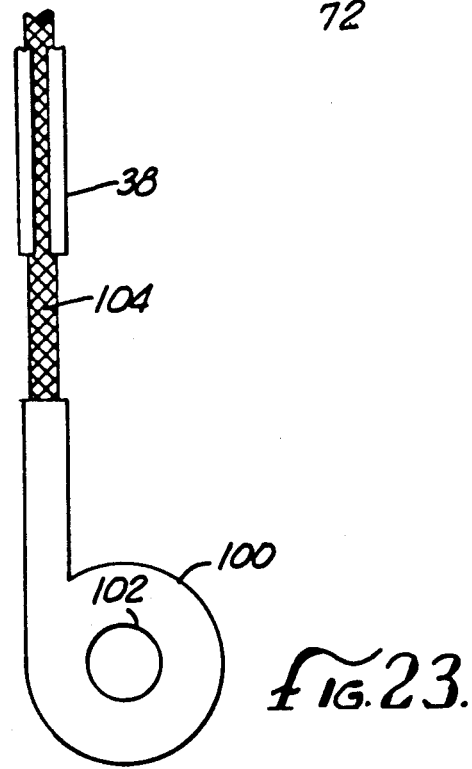

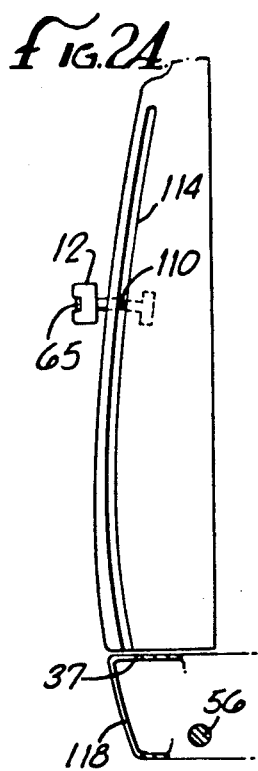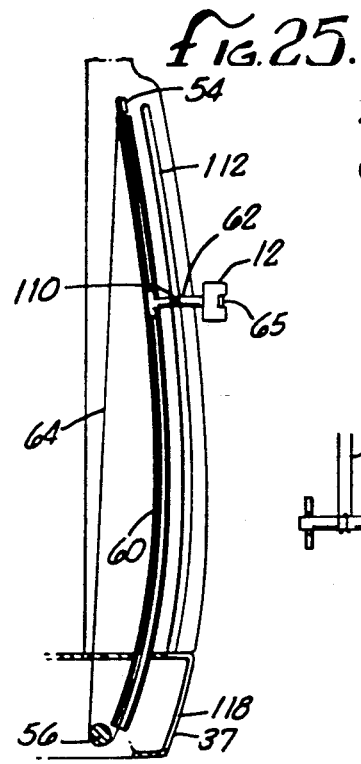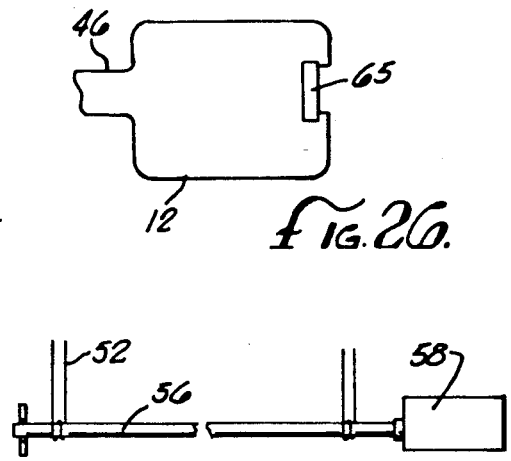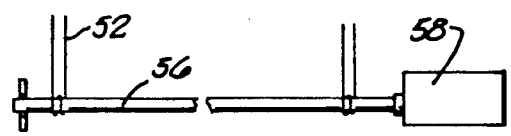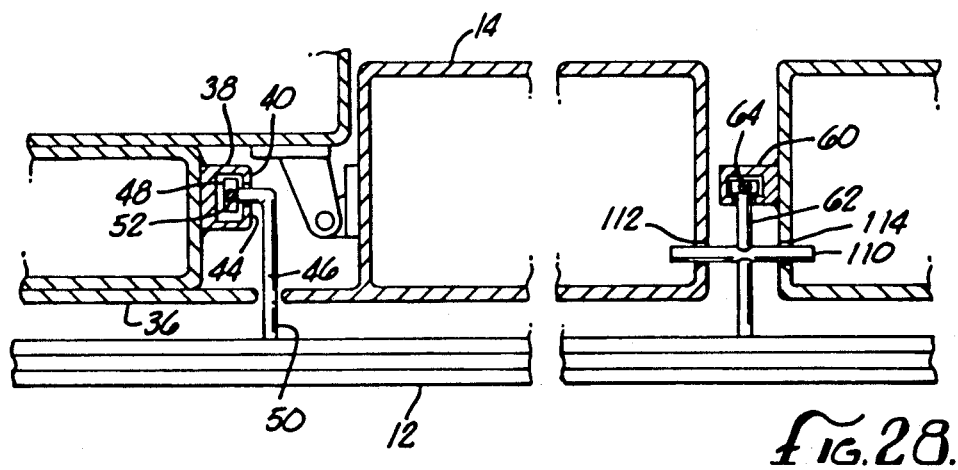

PROTECTION SYSTEM FOR A VEHICLE

This application is a continuation of Ser. No. 244,814, filed Sep. 14, 1988, now abandoned.

BACKGROUND OF THE INVENTION

The field of the present invention is mechanical guard systems for protecting a vehicle.

In our present society one of our chief concerns as well as that of the police department and insurance companies is vehicle theft and vandalism. These problems are becoming more and more of a financial burden to the pubic in general. Because of police manpower shortages the police typically cannot keep up with these problems and the individual and insurance companies are left to bear the burden of such damage and loss. Often the individual is left to bear the cost of replacing a window, a radio or even the entire dashboard. With car theft, insurance companies typically must bear the burden of the loss which is believed to be ultimately paid for through insurance premiums. Thus, this problem is one that affects and concerns the public in general.

Systems have been devised for protecting vehicles while not in use. Covers have long been employed for protection against the elements. However, such covers do not prevent damage from vandalism and theft. Other systems have been directed to the problem of inconsiderate drivers and passengers of vehicles opening their doors against the side of a vehicle when parked parallel thereto. After owning a vehicle in an urban or suburban environment for any length of time, such a vehicle is very likely to have a number of chips and marks on the side thereof due to such inconsiderate action or worse from intentional acts.

One such system for protecting a vehicle includes fixed horizontal trim and bumper work designed to provide a tough outer profile on the vehicle. However, such a system tends to be self-defeating because other vehicles have similar devices which become the first element to contact the adjacent car when the door is opened, again resulting in chips and scratches. Further, such devices are frequently incompatible with the overall design of the vehicle.

An active system has been developed as disclosed in U.S. Pat. No. 4,530,519. This system includes a flexible side panel on a spindle positioned between the wheels of the vehicle. The spindle is unwound and the shield runs upwardly on tracks between door and body on the vehicle.

SUMMARY OF THE INVENTION

The present invention is directed to a system for protecting vehicles from vandalism, attempted entry and impact when the vehicle is not in use. The protection system contemplates the employment of protective elements which can be positioned to cover or guard portions of the vehicle.

In one aspect of the present invention, the protection system provides a window and top cover which, when received by side bars on the vehicle, is held in place. The cover may be of entry resistant, semiflexible material with impact resistent members to protect the windows.

In another aspect of the present invention, a track on the vehicle cooperates with a cable extending therealong to mount and control a protection member. The protection member is thereby capable of moving up and down on the side of the vehicle to provide protection and to prevent the doors from being opened when the vehicle is not in use. Such members may be used to anchor and lock a window and top cover to a vehicle.

A further aspect of the present invention contemplates a locking latch which may be actuated to extend between the door and door jam of the automobile to securely lock the door against entry. The flexible element associated with the track may be employed to actuate the latch.

Accordingly, it is an object of the present invention to provide an improved protection system for vehicles. Other and further objects and advantages will appear hereinafter.

BRIEF DESCRIPTION OF THE DRAWINGS

FIG. 8 is a side view of a cover positioned in a protection member which includes a mechanical drive.

FIG. 9 is a side view illustrating the mechanical drive of FIG. 8.

FIG. 10 is a detail cross section of the drive of FIG. 9.

FIG. 11 is a cross section taken along line 11—11 of FIG. 10.

FIG. 12 is a crank for actuating said drive.

FIG. 13 is a side elevation of a vehicle with the protection member in the lower position.

FIG. 14 is a side elevation of a vehicle with the protection member in the upper position.

FIG. 15 is a cross-sectional view taken along line 15—15 of FIG. 13 illustrating a continuous cable drive.

FIG. 16 is a cross-sectional view taken along line 16—16 of FIG. 14 illustrating a continuous cable drive.

FIG. 17 is a cross-sectional view taken along line 17—17 of FIG. 14.

FIG. 20 illustrates a second and preferred drive mechanism in a view similar to that of FIG. 16.

FIG. 21 is a detail view taken along line 21—21 of FIG. 20.

FIG. 22 is an elevation view taken along line 22—22 of FIG. 21.

FIG. 23 is a side elevation of yet another drive mechanism of the present invention.

FIG. 24 is a cross-sectional view taken along line 24—24 of FIG. 14.

FIG. 25 is a cross-sectional view taken along line 25—25 of FIG. 14.

FIG. 26 is an end view of a protection member.

FIG. 27 is a detailed view of a drive for a single protection member.

FIG. 28 is a cross-sectional plan view taken along line 28—28 of FIG. 14.

DETAILED DESCRIPTION OF THE PREFERRED EMBODIMENT

Turning in detail to the drawings, FIGS. 1 through 7 illustrate a cover 10. A protection member 12, shown to be a bar, is associated with the cover 10 to hold the cover 10 in place. The operation of the bar 12 will be more fully discussed below.

Figure 1:
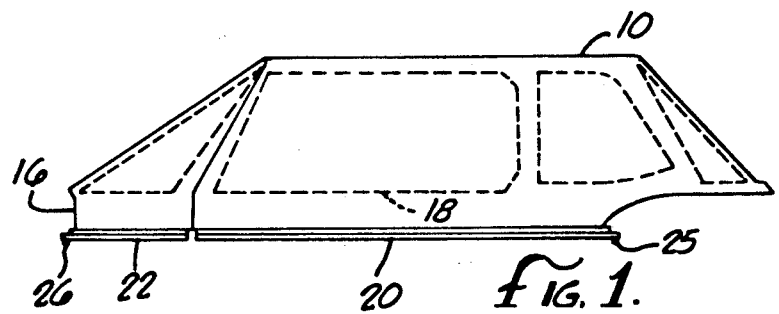
FIG. 1 is a side view of a window and top cover of the present invention.
Figure 2:
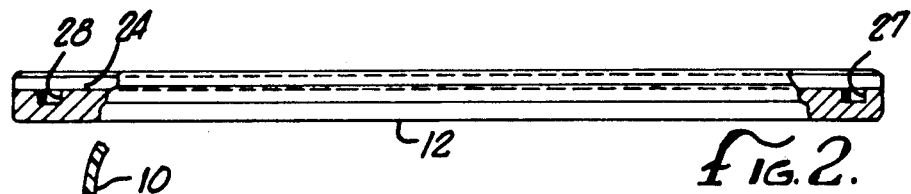
FIG. 2 is a side view, partially broken away, of a protection member by which the cover is anchored.
Figure 5:
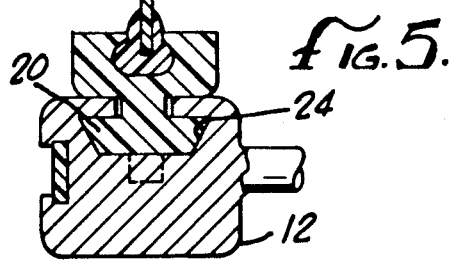
FIG. 5 is a cross-sectional view taken along line 5—5 of FIG. 4.
Figure 3:
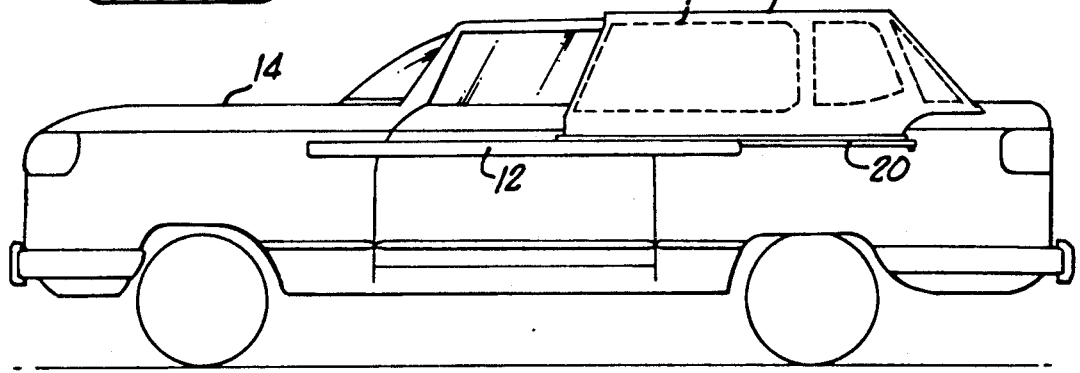
FIG. 3 is a side elevation of a vehicle with a cover of the present invention partially installed thereon.
Figure 4:
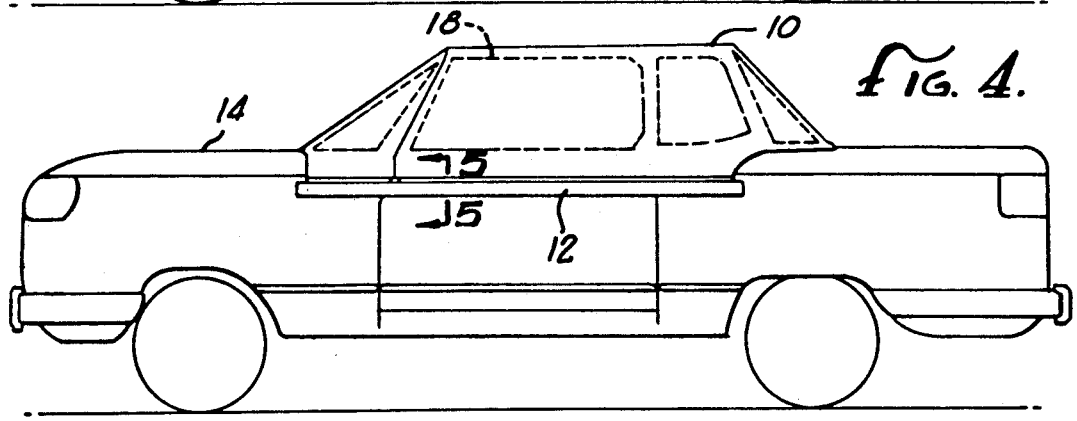
FIG. 4 is a side elevation of the vehicle with the cover fully installed.
Figure 6:
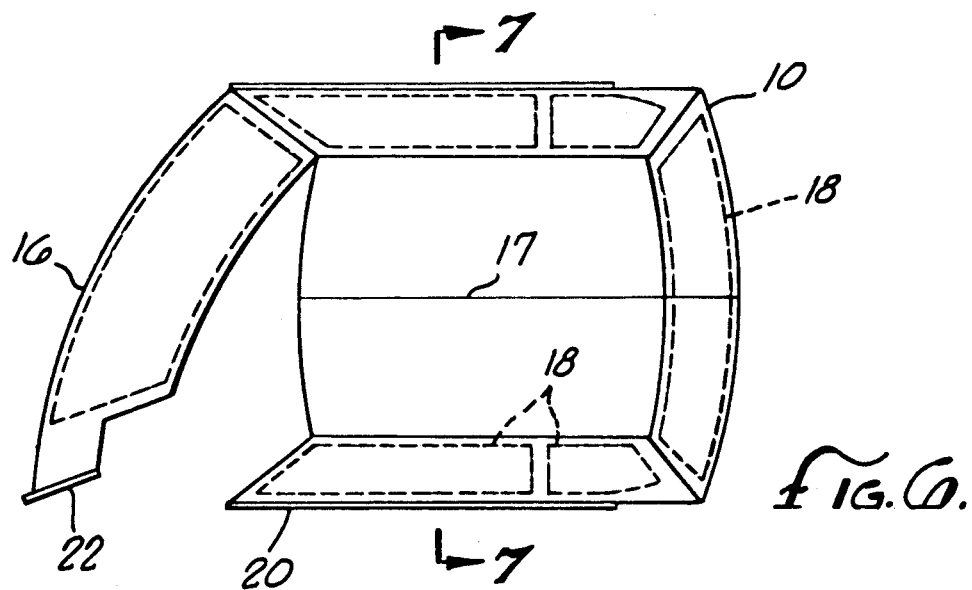
FIG. 6 is a plan view of a cover of the present invention.
Figure 7:
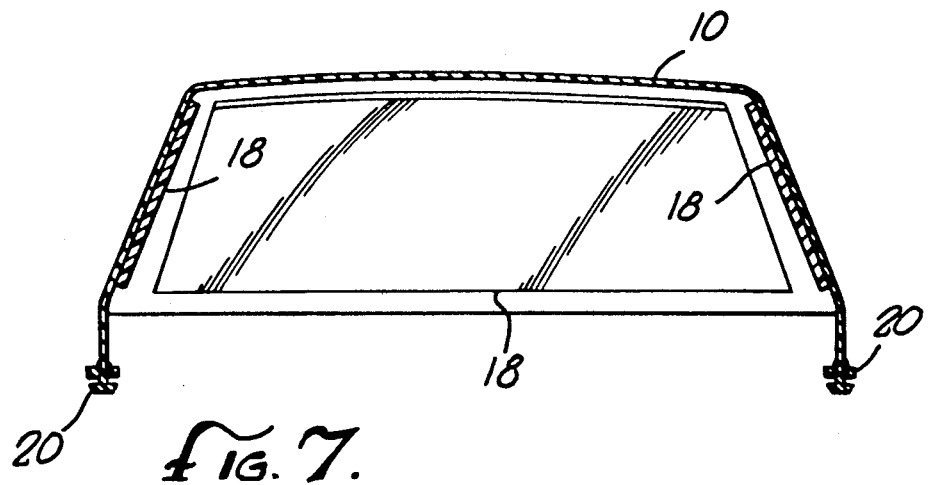
FIG. 7 is a cross-sectional end view of a cover of the present invention.

The cover 10 is designed to fit relatively closely to a given window and top construction of a vehicle such as the automobile 14 illustrated in FIGS. 3 and 4. In this instance, the cover 10 is positioned from behind onto the bars 12 which are in turn located on either side of the vehicle 14. It can be seen that the cover 10 is of flexible material. However, it is contemplated that the cover 10 be of a very tough plastic or include imbedded metal filaments to resist cutting and tearing. The cover 10 conveniently incorporates a front flap 16 which is integrally associated at one end with the cover 10 and which can be drawn across the windshield of the vehicle to complete the covering of the window area of the vehicle. If it is desired to have the cover 10 very rigid, a hinge or weakened portion 17 may be employed to allow placement in a trunk.

The cover 10 includes stiff, impact resistant panels 18 designed to cover over the window area on the vehicle for which the cover 10 has been constructed. Also included as part of the cover 10 is a rod 20 extending along either side of the cover 10 and a rod 22 extending along one edge of the flap 16. The rod 20 includes an interlocking head cooperating with an undercut channel 24 located in the bar 12. As the rod 20 is of substantially rigid material, only flexing along its length, it cannot be pulled easily from the undercut channel 24. The same is true of the rod 22.

Each of the rods 20 and 22 include a lock 25 and 26, respectively. These locks 25 and 26 cooperate with locking holes 27 and 28, respectively, in the bar 12. The locks may be located at any convenient point and typically incorporate keys for the operation thereof. Naturally, the bar 12 can be employed without the cover as illustrated in FIGS. 13 and 14.

Turning to FIGS. 8 through 12, a drive mechanism is illustrated for placing and removing the rods 20 in the bars 12. A chain or cable 29 is arranged about two sprockets or rollers 30 and 31 at either end of the bar 12. A cavity 32 extends along the bar 12 to receive the chain 29. One or both of the sprockets or rollers 30 and 31 includes a means for rotating and driving the system. A hexagonal hole 33 is illustrated in sprocket 31. A crank 34 may be used to drive the chain. Electrical power may also be used.

The rod 20 includes a tooth 35 which engages the chain 9. The tooth may form part of the locking mechanism if desired. The tooth 35 extends downwardly from the bottom of the rod 20 so as to engage the chain 29 between links. Thus, rotation of the sprocket 31 with the crank 34 advances or retracts the tooth 35 and in turn the rod 20.

Looking then to FIGS. 13 through 17, attention is directed to the protection member, or bar 12. The bar 12 is shown in a lowered position in FIG. 13 and in a raised position in FIG. 14. In the lowered position, the bar 12 does not interfere with the door of the vehicle 14.

In the upper position, the bar 12 protects the side of the vehicle and also prevents the door from being opened. It may be noted in FIG. 14 that the bar 12 is positioned on the vehicle where the vehicle is subject to the greatest possibility of impact from adjacent car doors and the like. The bar 12 is also spaced outwardly from the vehicle a small distance. This provides added protection to stop any door even before a protruding guard on the offending door can contact the side of the protected vehicle.

The forward body panel and structure of the vehicle is shown to include a curved forward fender 36 and a lower panel 37. Fixed on the fender panel 36 is a track 38. The track 38 is illustrated to be divided into two portions, a first upper portion and a second lower portion. The upper portion down to approximately the bottom edge of the fender panel 34 is curved so as to remain the same distance away from the fender panel 36. At the lower second portion, the track 38 curves inwardly away from the lower panel 37. The track is illustrated in cross section in FIG. 28 and is shown to be a channel with inwardly extending flanges 40 and 44. The resulting structure includes an elongate passage area to operate as a semienclosed track.

Positioned in the track 38 is a mounting bracket 46. The mounting bracket 46 is shown to include a first head 48 which resides within the cavity defined in the track 38. The flanges 40 and 44 cooperate with the head 48 of the mounting bracket 46 to define interlocking surfaces for retaining the bracket 46 in the track 38 such that it can slide vertically therein. The mounting bracket 46 also includes an extended portion 50 which extends outwardly of the vehicle.

Controlling the location of the mounting bracket 46 is a flexible, elongate element 52. This element is preferably in the form of a cable which extends through the track 38 and is fixed to the head 48 of the bracket 46. Multiple drive systems are illustrated. The cable and drive system of FIG. 20 is generally preferred. However, FIGS. 15 and 16 illustrate a continuous loop of cable 52. This cable 52 is threaded over a pulley 54 above the track 38 and a shaft 56 below the track 38. Clearly, movement of the cable 52 will result in movement of the bracket 46, the displacement of which is illustrated in FIGS. 13 and 14.

The shaft 56 is part of a drive means for actuating the system. Illustrated in FIG. 14 is the shaft 56 associated with a motor 58. Activation of the motor 58 drives the shaft 56 and in turn the cable 52. Limit switches may conventionally be employed to limit the operation of the system between two extreme positions. A detail of the motor 58 and the cables 52 on the shaft 56 is illustrated in FIG. 27. The arrangement of the shaft 56 and motor 58 may be determined by the available room and construction of the vehicle. For example, shafts 56 may extend down the lower panels 37 on either side of the vehicle. Alternatively, a center shaft 56 may be employed to operate both sides of the vehicle. As a further alternative, one or two shafts may extend transversely of the vehicle to cooperate with cables in a similar manner.

A second track 60 is illustrated in FIGS. 25 and 28. The track 60 can be seen in cross section in its placement as cooperating with a mounting bracket 62. The mounting bracket 62 is shown to be straight rather than bent, as is the mounting bracket 46, to accommodate the difference in placement between the tracks 38 and 60. Again, a flexible, elongate element in the form of a cable 64 is associated with the bracket 62 to run through the track 60.

Between the brackets 46 and 62 extends the protection member 12 which is fixed to each of the brackets. The protection member 12 is shown to extend beyond the brackets. The brackets are of sufficient length such that the bar 12 is displaced outwardly away from the body panel of the vehicle when in the upper position and yet drawn much closer to the body panel in the lower, stored position. The bar 12 is preferably of structural material in order that it might not easily bend upon impact or be torn off by an intruder. A reflector 65 is shown in the bar 12 of FIG. 26 on the outer side thereof. This is an aesthetic and safety option.

Figure 19:
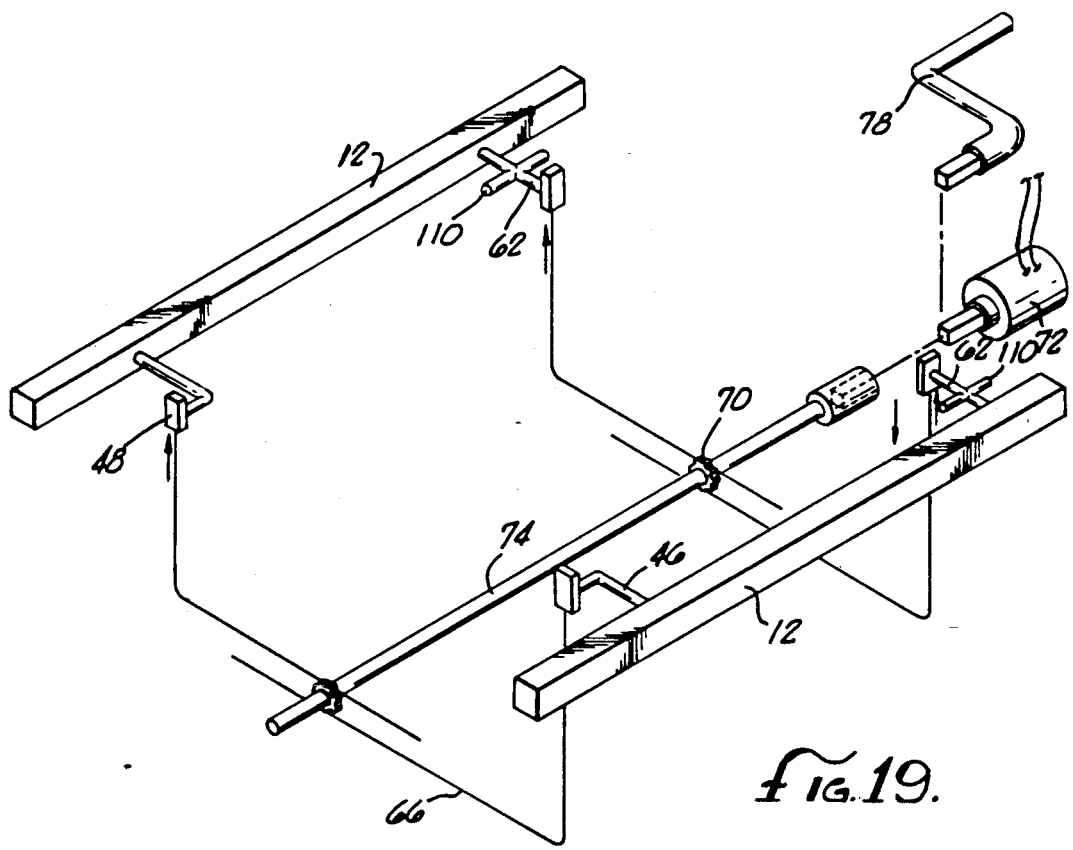
FIG. 19 is a schematic oblique view of a drive layout for two protection members.
Figure 18:
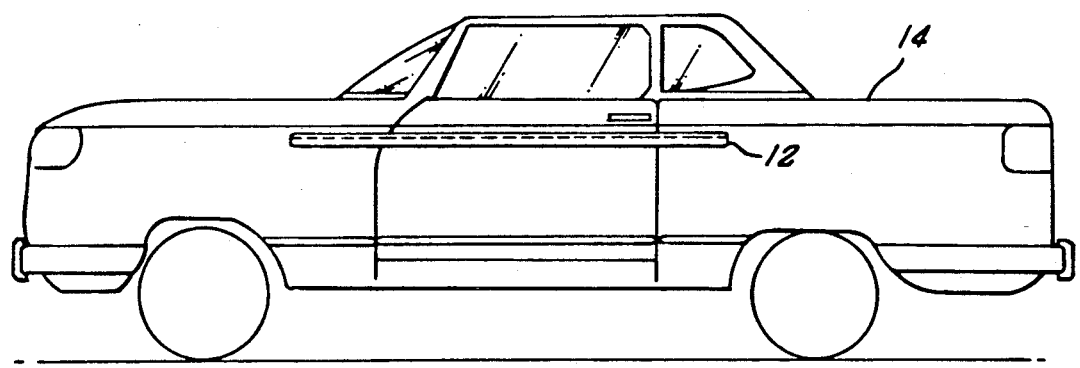
FIG. 18 is a side elevation of a vehicle with a protection member using a second drive system.

Looking to alternative drives, the most preferred embodiment is illustrated in FIGS. 18 through 22. A length of cable 66 is positioned in the track 38. The track 38 provides sufficient lateral constraint such that the cable 66, when in the track 38, is able to push as well as pull the protection member 12. The cable 66 is provided with a ridge 68 wrapped about the cable 66 to cooperate with a toothed sprocket 70. The toothed sprocket 70 is driven by a motor 72 through its shaft 74. An additional guide 76 constrains the cable 66 in engagement with the sprocket 70. A second cable 66 is similarly arranged on the other side of the sprocket 70 which is employed to drive a second bracket 46 or 62. One such arrangement is illustrated in FIG. 19 where a single shaft 74 is driven by a motor 72 to drive four such cables 66. As can be seen in FIG. 19, a crank 78 may be employed as an emergency mechanism to replace the motor 72 in the event of a power failure in the vehicle. Also a second battery can be employed with an appropriate bypass switch to operate the side protection members in the event of power failure of the vehicle.

FIG. 23 illustrates a drive using an automobile radio antenna type drive. A case 100 cotnains a shaft 102 which is motor driven. The cable 104 is wound in the case 100 and attached to the shaft 102. By rotation of the shaft, the cable 104 may be driven from or into a track 38.

Looking again to the bracket 62, a latch 110 is shown associated with the bracket 62 to move up and down with the protection member 12. The latch 110 rides within slits 112 and 114 located in the door and rear fender body panel of the vehicle. This extension of the latch 110 between the door and door jam prevents one from opening the door with the protection system in place. The slits 112 and 114 extend downwardly into the lower body panel in order that the latch 110 may be extracted from a position locking the car door. Also the lower body panel 37 includes outwardly extending slits 116 and 118 to accommodate the brackets 46 and 62, respectively, when the protection member the brackets 46 and 62, respectively, when the protection member 12 is in its stowed position.

Accordingly, an improved protection system and a covering member are here disclosed. While embodiments and applications of this invention have been shown and described, it would be apparent to those skilled in the art that many more modifications are possible without departing from the inventive concepts herein. The invention, therefore, it not to be restricted except in the spirit of the appended claims.

What is claimed is:

1. A protection system for a vehicle having a body with a top, doors and windows, comprising horizontally extending elements positionable on either side of a vehicle;
means for moving and retaining said horizontally extending elements between a first position below the vehicle door and a second position near but below the windows of the vehicle, outwardly of the vehicle door;
a cover of flexible material conforming to the shape of the top and window area of the vehicle;
attachment means fixed to said horizontally extending elements and to said cover for coupling said cover to said horizontally extending elements on either side of the vehicle.

2. The proection system of claim 1 wherein said attachment means each include a channel element and a slider element with interlocking surfaces to retain said slider element in said channel element.

3. The proetction system of claim 2 wherein said slider elements are on said cover and said channel elements are on said horizontal extending elements.

4. The proetction system of claim 2 wherien each said attachment means includes a chain in said horizontally extending element and drive means to mvoe said chain along said horizontally extending element, said slider element including a tooth for interlocking with said chain.

5. The proetction system of claim 1 wherien said attachment means includes locking means for securing said cover from unauthorized removal.

6. The protection system of claim 1 wherein said cover further includes stiff, impact resistent panels over the windows of the vehicle when said cover is in place.

7. A protection system for a vehicle having a body, and a door, comprising
a track mounted on the vehicle;
a flexible, elongate element extending along said track;
a horizontally extending latch fixed to said flexible, elongate element, said latch being held to move along said track;
a first vertical slit in the door of the vehicle;
a second vertical slit in the body of the vehicle, said first and second slits being mutually opposed with the door of the vehicle closed, said latch being aligned to move longitudinally in said two slits.

8. A protection system for a vehicle having a body with a door and an elongate, substantially vertical opening in the body, comprising
a track on the vehicle extending substantially vertically adjacent to and from below the lower edge of the door upwardly on the side of the vehicle and having a first side extending therealong which is accessible outwardly of the vehicle, said track being located in the vehicle and said first side extending along the elongate opening of the vehicle, said track including a first section and a second section, said first section being substantially parallel to the outside of the vehicle, said second section diverging inwardly away from the outside of the vehicle;
a flexible, elongate element extending along said track;
a mounting bracket fixed to said element and extending outwardly, said bracket being held to move along said track;
a protection member fixed to said bracket outwardly of the vehicle and extending longitudinally of the vehicle selectively over the door;

drive means for controllably driving said flexible, elongate element along said track.

9. The proetction system of claim 8 wherein said second portion is located at the bottom of the vehicle extending below the door thereof.

10. A protection system for a vehicle having a body and a door therein, comprising
- a track on the vehicle extending substantially vertically adjacent to and from below the lower edge of the door upwardly on the side of the vehicle and having a first side extending therealong which is accessible outwardly of the vehicle;
- a flexible, elongate element extending along said track;
- a mounting bracket fixed to said element and extending outwardly, said bracket being held to move along said track;
- a protection member fixed to said bracket outwardly of the vehicle and extending longitudinally of the vehicle selectively over the door;
- drive means for controllably driving said flexible, elongate element along said track;
- a horizontally extending latch, a first vertical slit in the door of the vehicle and a second vertical slit in the body of the vehicle, said first and second slits being mutually opposed with the door of the vehicle closed, said latch being fixed to one said flexible, elongate element and being aligned to move longitudinally into said slits.

* * * * *